United States Patent
Jo et al.

(10) Patent No.: US 9,296,015 B2
(45) Date of Patent: Mar. 29, 2016

(54) METHOD FOR MANUFACTURING THICK POLYIMIDE FLEXIBLE METAL-CLAD LAMINATE

(75) Inventors: Byoung Wook Jo, Daejeon (KR); Ho Sub Kim, Seoul (KR); Young Do Kim, Daejeon (KR); Weon Jung Choi, Daejeon (KR); Dae Nyoun Kim, Daejeon (KR)

(73) Assignee: SK INNOVATION CO., LTD. (KR)

( * ) Notice: Subject to any disclaimer, the term of this patent is extended or adjusted under 35 U.S.C. 154(b) by 713 days.

(21) Appl. No.: 13/328,514

(22) Filed: Dec. 16, 2011

(65) Prior Publication Data

US 2012/0156476 A1 Jun. 21, 2012

(30) Foreign Application Priority Data

Dec. 20, 2010 (KR) .................. 10-2010-0130383
Nov. 25, 2011 (KR) .................. 10-2011-0124067

(51) Int. Cl.
*B05D 3/14* (2006.01)
*B32B 15/08* (2006.01)
(Continued)

(52) U.S. Cl.
CPC ............... *B05D 3/148* (2013.01); *B32B 15/08* (2013.01); *B32B 15/088* (2013.01); *B32B 2037/243* (2013.01); *B32B 2307/538* (2013.01); *B32B 2311/00* (2013.01); *B32B 2379/08* (2013.01); *B32B 2457/20* (2013.01); *Y10T 428/265* (2015.01); *Y10T 428/31681* (2015.04)

(58) Field of Classification Search
CPC ............ B32B 15/088; B32B 2037/243; B32B 38/008; B05D 3/148; B05D 1/36; B05D 1/38
USPC ........ 156/242, 272.6, 272.8; 427/98.8, 407.1, 427/409, 535, 536
See application file for complete search history.

(56) References Cited

U.S. PATENT DOCUMENTS

| | | | |
|---|---|---|---|
| 5,137,751 A * | 8/1992 | Burgess et al. ............... | 427/123 |
| 2007/0231495 A1* | 10/2007 | Ciliske et al. ............... | 427/407.1 |
| 2009/0101393 A1* | 4/2009 | Kim et al. .................... | 174/254 |

FOREIGN PATENT DOCUMENTS

| | | |
|---|---|---|
| CN | 1733473 | 2/2006 |
| CN | 1284430 | 11/2006 |
| CN | 101400514 | 4/2009 |

(Continued)

OTHER PUBLICATIONS

"Enhanced Adhesion to Interlevel Polyimide" IBM Technical Disclosure Bulletin Dec. 1983.*

(Continued)

*Primary Examiner* — John Goff
(74) *Attorney, Agent, or Firm* — Cantor Colburn LLP

(57) ABSTRACT

Provided is a method for manufacturing a flexible metal-clad laminate using a casting method, including: (a) forming a first polyimide layer having a coefficient of linear thermal expansion of 25 ppm/K or less above a metal layer; (b) plasma-treating a surface of the first polyimide layer; and (c) forming a second polyimide layer having a coefficient of linear thermal expansion of 25 ppm/K or lower above the first polyimide layer. The flexible metal-clad laminate according to the present invention can have excellent adhesion between the polymer film and the metal conductive layer, a low dimensional change, and a low production cost, because of superior casting workability, even though the thickness of polyimide becomes increased.

9 Claims, 2 Drawing Sheets

(51) Int. Cl.
  *B32B 15/088* (2006.01)
  *B32B 37/24* (2006.01)

(56) References Cited

FOREIGN PATENT DOCUMENTS

| | | |
|---|---|---|
| JP | 2006521221 | 9/2006 |
| JP | 2008068406 | 3/2008 |
| JP | 2009241597 | 10/2009 |
| JP | 2010116443 | 5/2010 |
| KR | 1020070087981 | 8/2007 |
| KR | 1020100048474 | 5/2010 |
| WO | 02089546 | 11/2002 |
| WO | 2004085146 | 10/2004 |
| WO | 2007102691 | 9/2007 |

OTHER PUBLICATIONS

Machine translation of JP 2008-068406 date unknown.*

* cited by examiner

METHOD FOR MANUFACTURING THICK POLYIMIDE FLEXIBLE METAL-CLAD LAMINATE

CROSS-REFERENCE TO RELATED APPLICATIONS

This application claims priority under 35 U.S.C. §119 to Korean Patent Application No. 10-2010-0130383, filed on Dec. 20, 2010, and Korean Patent Application No. 10-2011-0124067, filed on Nov. 25, 2011 in the Korean Intellectual Property Office, the disclosures of which are incorporated herein by reference in their entirety.

TECHNICAL FIELD

The following disclosure relates to a method for manufacturing a thick polyimide flexible metal-clad laminate, and more particularly to a method for manufacturing a thick polyimide flexible metal-clad laminate, capable of enabling easy operability in a manufacturing process at the time of manufacturing a product in which polyimide, as a main material of a flexible circuit used in electronic equipment, is thick such that the total thickness thereof is 30 μm or more, and allowing the manufactured laminate to have an excellent adhesion between a polymer film and a metal conductive layer and have a low dimensional change.

BACKGROUND

On a printed circuit board (PCB), electric wirings connecting various components are expressed by wiring figures in accordance with circuit design. The printed circuit board (PCB) serves to connect and support various components. These printed circuit boards are classified into a rigid printed circuit board, a flexible printed circuit board, a rigid-flexible printed circuit board made by combining the two boards, and a multi-flexible printed circuit board similar to the rigid-flexible printed circuit board.

A flexible metal-clad laminate is manufactured by laminating a polymer film layer and a metal conductive layer, and is characterized by having flexible properties. This flexible metal-clad laminate is mainly used in electronic devices or materials of the electronic devices requesting flexibility or pliability. The thickness of the polymer film layer may be requested to be variously changed depending on the usage thereof. Among them, the demand for a thick metal-clad laminate having a thick polymer film layer is largely growing in fields in which electric properties of high reliability are needed, such as the aerospace industry and a transmission of vehicles.

With respect to this technology, the flexible metal-clad laminate of the related art mainly employs a method of laminating a film type thermoplastic polyimide onto a metal foil, and a method of directly coating a polyamic acid varnish on a metal foil. However, both of these methods have advantages and disadvantages. In the laminating method, since the already cured polyimide film is used during a manufacturing procedure, the thickness thereof does not greatly affect workability. However, the material cost of the polyimide film is comparatively high and considering that it is general to use a thermoplastic polyimide having a high coefficient of linear thermal expansion, a dimensional change is large when the thermoplastic polyimide is subjected to a high temperature process such as component mounting. Whereas, according to the manufacturing method conducted by casting a polyimide precursor, the polyimide film can be manufactured with a lower material cost and even though thermosetting polyimide having relatively low coefficient of linear thermal expansion is used, it can achieve a sufficient adhesiveness with a metal layer and thus, allowing an excellent dimensional stability even at a high-temperature process. However, as the thickness of the polyimide gets increased, blister and film curl severely occur while the solvent contained in the polyamic acid varnish is vaporized, and thus, the manufacture thereof is difficult.

SUMMARY

An embodiment of the present invention is directed to providing a method for manufacturing a metal-clad laminate using a casting method, capable of forming a polymer film having excellent physical properties on a metal layer, in particular, capable of enabling easy operability in a manufacturing process even though the entire polyimide layer is thick such that the total thickness thereof is 30 μm or more, and allowing the manufactured laminate to have an excellent adhesion between a polymer film and a metal conductive layer and have a low dimensional change.

The present invention provides a method for enabling the manufacture of a thick flexible metal-clad laminate.

In one general aspect, a method for manufacturing a flexible metal-clad laminate using a casting method, includes: (a) forming a first polyimide layer having a coefficient of linear thermal expansion of 25 ppm/K or less above a metal layer; (b) plasma-treating a surface of the first polyimide layer; and (c) forming a second polyimide layer having a coefficient of linear thermal expansion of 25 ppm/K or lower above the first polyimide layer.

The total thickness of the polyimide layers formed above the metal layer may be 30 μm or more.

More specifically, the flexible metal-clad laminate may be finally completed by: (a) casting and drying a polyamic acid varnish of one or more layers above a metal layer, and imidizing the applied polyamic acid varnish (hereinafter, referred to as a "first polyimide precursor layer") by curing, to form a first polyimide layer having a coefficient of linear thermal expansion of 25 ppm/K or less; (b) plasma-treating a surface of the first polyimide layer; and (c) casting and drying a polyamic acid varnish of one or more layers above the first polyimide layer, and imidizing the applied second polyamic acid varnish (hereinafter, referred to as a "second polyimide precursor layer") by curing, to form a second polyimide layer having a coefficient of linear thermal expansion of 25 ppm/K or less.

Here, the first polyimide layer and the second polyimide layer may have a low coefficient of linear thermal expansion, which is 25 ppm/K or less. If the coefficient of linear thermal expansion thereof is above 25 ppm/K, a difference in the coefficient of linear thermal expansion between a copper foil as a base and the polyimide layer is large, which may cause an increase in the dimensional change when the copper foil is etched or during a high-temperature process.

Further, curing is performed to transform the polyamic acid varnish into polyimide through an imidization process. Curing may be performed by employing any typical method, and curing also may be performed by using heat, infrared ray, ultraviolet ray, and the like, but is not limited thereto.

In the present invention, the total thickness of the polyimide layers formed above the metal layer may be 30 μm or more, and preferably 30 to 60 μm. If the thickness of a film is below 30 μm, the film can not realize electric properties of high-reliability as compared with the existing product. If the thickness of a film is above 60 μm, flexible property thereof may be remarkably degraded, and thus, the film can not be applied to a flexible circuit.

In the present invention, the thicknesses of the first polyimide layer and the second polyimide layer each may be preferably 30 μm or less, and specifically 5 to 25 μm, which enable a thick film to be achieved by the present invention to be formed within a range in which curling of the film does not occur at the time of manufacturing the polyimide precursor layer. If the thickness of the first polyimide layer or the second polyimide layer is above 25 μm, operability is remarkably degraded due to film curl, and it is difficult to efficiently evaporate the solvent, resulting in increasing the possibility that blister may occur during a polyimide curing process. On the contrary to this, if one of the two polyimide layers is below 5 μm, the other needs to have a thickness of at least 25 μm, and thus this is unfavorable.

Further, after a surface of the first polyimide layer is plasma-treated, the surface roughness thereof may be preferably 0.3 to 1.5 μm, which results in excellent adhesion, thereby preventing de-lamination at an interface.

Further, the present invention may include a method for manufacturing a double-sided structure flexible metal-clad laminate, according to which a thermoplastic polyimide layer is formed above the second polyimide layer of the above flexible metal-clad laminate, and then a metal foil is laminated therewith.

Further, the present invention may include a method for manufacturing a double-sided structure flexible metal-clad laminate, according to which an outer layer of the second polyimide layer is made of a thermoplastic polyimide layer, and a metal foil is laminated therewith.

In other words, the method for manufacturing the double-sided structure flexible metal-clad laminate may be included in the scope of the present invention, the method may further include: after the step (c), (d) forming a thermoplastic polyimide layer above the second polyimide layer; and (e) laminating the thermoplastic polyimide layer with a metal foil.

In other words, the method for manufacturing the double-sided structure flexible metal-clad laminate may be included in the scope of the present invention, the method may further include: after forming the second polyimide layer including the thermoplastic polyimide layer in which the thermoplastic polyimide layer is coated, dried, and cured on the outermost part thereof, in the step (c), (d) laminating the thermoplastic polyimide layer with a metal foil.

Preferably, the thermoplastic polyimide layer may have a thickness of 7 μm or less, and more preferably, 1 to 7 μm, a glass transition temperature of 180° C. to 300° C., a coefficient of linear thermal expansion of 30 ppm/K or more, and more specifically 30 to 80 ppm/K.

If the glass transition temperature of the thermoplastic polyimide layer is 180° C. or lower, heat resistance reliability of the final product gets drastically deteriorated. If the glass transition temperature is 300° C. or higher or the thickness of the thermoplastic polyimide layer is 1 μm or less, it is difficult to obtain sufficient adhesion between the polyimide layer and the base after laminating. Also, the thermoplastic polyimide having this glass transition temperature generally has a high coefficient of linear thermal expansion of 30 ppm/K or more. If the coefficient of linear thermal expansion of the thermoplastic polyimide layer is 80 ppm/K or more or the thickness of the thermoplastic polyimide layer is thicker than 7 μm, the coefficient of linear thermal expansion of all the polyimide layers is increased, and thus, finally, the dimensional stability of polyimide may be deteriorated.

Other features and aspects will be apparent from the following detailed description, the drawings, and the claims.

DETAILED DESCRIPTION OF MAIN ELEMENTS

10: metal layer
20: first polyimide precursor layer
30: first polyimide layer
40: second polyimide precursor layer
50: second polyimide layer

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail with reference to the accompanying drawings.

Figure 1:
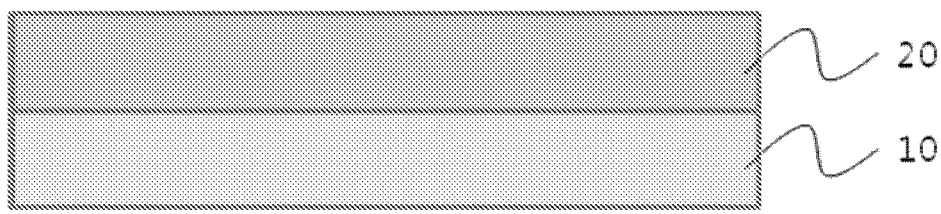
FIG. 1 is a cross sectional view of a laminate in which a polyamic acid varnish is firstly coated and dried on a metal plate.

FIG. 1 shows a cross sectional view of a laminate in which a polyamic acid varnish of one or more layers is coated on the surface of a metal layer by a casting method, followed by drying, to form a first polyimide precursor layer 20. As a coating method applicable in the present invention, knife coating, roll coating, die coating, curtain coating, or the like may be used. However, the coating method is not limited as long as the method satisfies the objects of the present.

Figure 2:
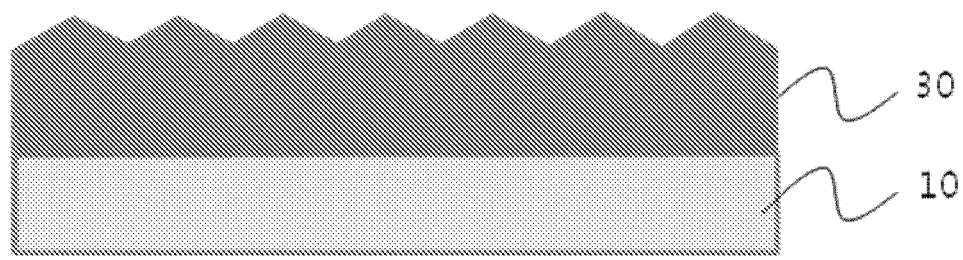
FIG. 2 is a cross sectional view of a laminate in which a polyimide precursor layer dried in FIG. 1 is imidized and then roughness is formed on a surface thereof by plasma treatment.

FIG. 2 shows a cross sectional view of a laminate in which a first polyimide layer 30 is formed by transforming the polyimide precursor layer 20 dried in FIG. 1 into a polyimide layer by an imidization process, and then performing plasma treatment thereon to increase a surface roughness thereof. If the surface roughness of the first polyimide layer is not sufficiently formed by the plasma treatment, the first polyimide layer has poor adhesion with a second polyimide layer to be formed thereon, with the result that the first polyimide layer is de-laminated from the second polyimide layer during a curing process. As energy used in the imidization process, heat, infrared (IR) rays, ultraviolet (UV) rays, or the like may be used, but not limited thereto.

Figure 3:
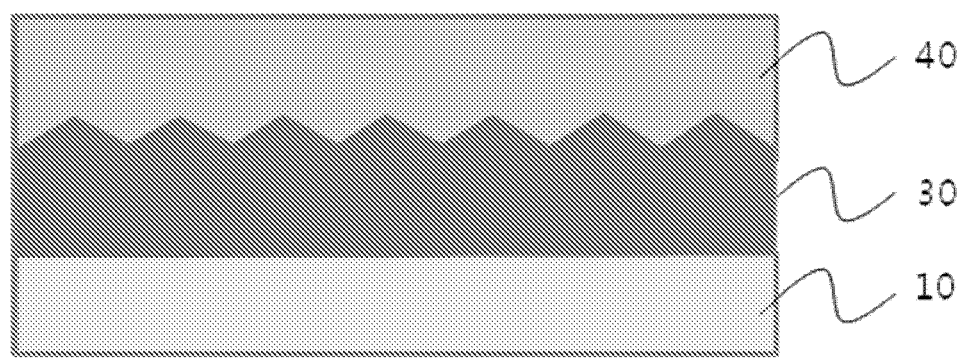
FIG. 3 is a cross sectional view of a laminate in which a polyamic acid varnish is coated and dried on a first polyimide layer formed in FIG. 2.

FIG. 3 is a cross sectional view of a laminate in which a polyamic acid varnish of one or more layers is coated and dried on the first polyimide layer 30 plasma-treated in FIG. 2, to form a second polyimide precursor layer 40. Here, the coating method may be or may not be the same as the method of coating the first polyimide precursor layer.

Figure 4:
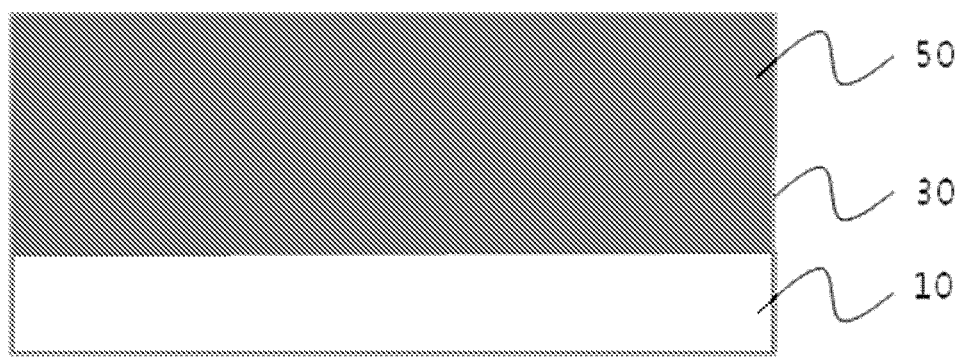
FIG. 4 is a cross sectional view of a metal-clad laminate in which a polyimide precursor layer dried in FIG. 3 is imidized to finally form a second polyimide layer on the first polyimide layer.

FIG. 4 shows a cross sectional view of a flexible metal-clad laminate in which the second polyimide precursor layer 40 formed in FIG. 3 is imidized, thereby finally forming the first polyimide layer 30 and the second polyimide layer 50. Here, the curing method may be or may not be the same as the method of curing the first polyimide precursor layer.

The present invention will be described in detail by explaining more specific examples and comparative examples of the present invention below. However, the present invention is not limited to the examples and comparative examples below, and may be embodied into various types of examples within the scope of the appended claims. Rather, the exemplary embodiments below may be provided so that this disclosure will be thorough and complete, and the present invention can be easily practiced by those skilled in the art.

The abbreviations used in the examples are as follows.
DMAc: N-N-dimethylacetamide
BPDA: 3,3',4,4'-biphenyltetracarboxylic acid dianhydride
PDA: p-phenylenediamine
ODA: 4,4'-diaminodiphenyl ether
BAPB: 4,4'-bis(4-aminophenoxy)biphenyl Physical properties disclosed in the present invention were determined according to the following measuring methods.

1. Coefficient of Linear Thermal Expansion (CTE)

The coefficient of thermal linear expansion was determined by averaging thermal expansion values between 100° C. and 250° C. measured by using a thermomechanical analyzer (TMA) while the temperature is raised up to 400° C. at a rate of 5° C. per minute.

2. Film Curl after Drying

The film curl was determined by cutting a film sample after drying the second polyimide precursor layer into a square shape of 30 cm by 30 cm, followed by rolling, and then measuring the diameter of the rolled film. Here, as the shrinkage of the film becomes more extreme, the diameter thereof is smaller, and this means that the film curl is severer.

3. Adhesion Between Polyimide Resin and Metal Layer

In order to determine the adhesion between the polyimide resin and the metal foil, the metal layer of the laminate was patterned in a width of 1 mm, and then the 180° peel strength thereof was measured using a universal testing machine (UTM).

4. Dimensional Change after Etching

It followed Method B of IPC-TM-650, 2.2.4. After position recognizing holes were drilled in four vertexes of a square sample of 275×255 mm in the machine direction (MD) and transverse direction (TD), the sample was stored in a thermohygrostat of 23° C. and 50% R.H. for 24 hours. Then, respective distances between holes were repetitively measured three times and then averaged. After that, the metal foil was etched, and then was stored in the thermohygrostat of 23° C. and 50% R.H. for 24 hours, the distances between holes was again measured. The change in the MD and TD of the thus measured values was calculated.

5. Roughness of Polyimide

The first polyimide layer was plasma-treated, and then cut into a square shape of 1 cm by 1 cm, and a surface roughness (Rz) value thereof was measured by using an atomic force microscopy (AFM).

6. External Observation of Polyimide

The laminate was cut into a square shape of 30 cm by 30 cm, and then the surface shape thereof was observed. Here, it was determined to be good when there are no blister and de-lamination between the metal foil and the polyimide layer or between the polyimide layers.

SYNTHETIC EXAMPLE 1

Diamines of PDA 12,312 g and ODA 2,533 g were completely dissolved in 211,378 g of a DMAc solution by stirring, under the nitrogen atmosphere, and then BPDA 38,000 g as dianhydride was added thereto in several lots. Thereafter, the stirring was continued for about 24 hours to prepare a polyamic acid solution. The thus prepared polyamic acid solution was casted on a film with a thickness of 20 μm, and then cured while the temperature was raised up to 350° C. for 60 minutes and maintained for 30 minutes. The measured coefficient of linear thermal expansion was 13.0 ppm/K.

SYNTHETIC EXAMPLE 2

Diamines of PDA 3.063 g and ODA 2,431 g were completely dissolved in 117,072 g of a DMAc solution by stirring, under the nitrogen atmosphere, and then BPDA 12,000 g as dianhydride was added thereto in several lots. Thereafter, the stirring was continued for about 24 hours to prepare a polyamic acid solution. The thus prepared polyamic acid solution was casted on a film with a thickness of 20 μm, and then cured while the temperature is raised up to 350° C. for 60 minutes and maintained for 30 minutes. The measured coefficient of linear thermal expansion was 25.1 ppm/K.

SYNTHETIC EXAMPLE 3

Diamine of BAPB 948 g was completely dissolved in 11,572 g of a DMAc solution by stirring, under the nitrogen atmosphere, and then BPDA 757 g as dianhydride was added thereto. Thereafter, the stirring was continued for about 24 hours to prepare a polyamic acid solution. The thus prepared polyamic acid solution was casted on a film with a thickness of 20 μm, and then cured while the temperature is raised up to 350° C. for 60 minutes and maintained for 30 minutes. The measured coefficient of linear thermal expansion was 65.1 ppm/K.

EXAMPLE 1

The polyamic acid solution prepared through [Synthetic Example 1] was coated on an electrolytic copper foil (Rz=2.0 μm) with a thickness of 12 μm such that the thickness thereof after curing was 27 μm, followed by drying at 130° C., to form a first polyimide precursor layer. The first polyimide precursor layer was cured from 150° C. to 395° C. for 10 minutes to form a first polyimide layer, and then was plasma-treated using a power of 6 kW under argon atmosphere. Again, the polyamic acid solution prepared through [Synthetic Example 1] was coated thereon such that a thickness thereof after curing was 27 μm, followed by drying and curing, to finally manufacture a metal-clad laminate of which the total thickness of the polyimide layers was 54 μm. The results were shown in Table 1.

EXAMPLE 2

The polyamic acid solution prepared through [Synthetic Example 2] was coated on an electrolytic copper foil (Rz=2.0 μm) with a thickness of 12 μm such that the thickness thereof after curing was 4 μm, followed by drying at 130° C. Then, the polyamic acid solution prepared through [Synthetic Example 1] was coated thereon such that the thickness thereof after curing was 25 μm, followed by drying at the same temperature, thereby forming a first polyimide precursor layer. The first polyimide precursor layer was cured from 150° C. to 395° C. for 10 minutes to form a first polyimide layer, and then was plasma-treated using a power of 6 kW under argon atmosphere. The measured coefficient of linear thermal expansion of the first polyimide layer was 16.2 ppm/K. Again, the polyamic acid solution prepared through [Synthetic Example 1] was coated thereon such that a thickness thereof after curing was 25 μm, followed by drying and curing, under the same conditions, to finally manufacture a metal-clad laminate in which the total thickness of the polyimide layers was 54 μm. The results were shown in Table 1.

EXAMPLE 3

The polyamic acid solution prepared through [Synthetic Example 2] was coated on an electrolytic copper foil (Rz=2.0 μm) with a thickness of 12 μm such that the thickness thereof after curing was 4 μm, followed by drying at 130° C. Then, the polyamic acid solution prepared through [Synthetic Example 1] was coated thereon such that the thickness thereof after curing was 23 μm, followed by drying at the same temperature, thereby forming a first polyimide precursor layer. The first polyimide precursor layer was cured from 150° C. to 395° C. for 10 minutes to form a first polyimide layer, and then was plasma-treated using a power of 6 kW under argon atmosphere. The polyamic acid solution prepared through [Synthetic Example 1] was coated thereon such that the thickness thereof after curing was 23 μm, followed by drying at 130° C. Then, the polyamic acid solution prepared through [Synthetic Example 3] was coated thereon such that the thickness thereof after curing was 4 μm, followed by drying at the same temperature, thereby forming a second polyimide precursor layer. This was cured from 150° C. to 395° C. for 10 minutes, thereby finally forming a metal-clad laminate in which the total thickness of the polyimide layers was 54 μm. The measured coefficient of linear thermal expansion of the second polyimide layer was 19.3 ppm/K. An electrolytic copper foil (Rz=2.0 μm) with a thickness of 12 μm was laminated therewith under the conditions of a temperature of 365° C. and a line pressure of 150 kgf/cm$^2$, thereby manufacturing a double-sided structure metal-clad laminate. The results were shown in Table 1.

EXAMPLE 4

The polyamic acid solution prepared through [Synthetic Example 2] was coated on an electrolytic copper foil (Rz=2.0 μm) with a thickness of 12 μm such that the thickness thereof after curing was 4 μm, followed by drying at 130° C. Then, the polyamic acid solution prepared through [Synthetic Example 1] was coated thereon such that the thickness thereof after curing was 21 μm, followed by drying at the same temperature, thereby forming a first polyimide precursor layer. The first polyimide precursor layer was cured from 150° C. to 395° C. for 10 minutes to form a first polyimide layer, and then was plasma-treated using a power of 6 kW under argon atmosphere. Again, the polyamic acid solution prepared through [Synthetic Example 1] was coated thereon such that the thickness thereof after curing was 5 μm, followed by drying and curing, under the same conditions, to finally manufacture a metal-clad laminate of which the total thickness of the polyimide layers was 30 μm. The results were shown in Table 1.

EXAMPLE 5

The polyamic acid solution prepared through [Synthetic Example 2] was coated on an electrolytic copper foil (Rz=2.0 μm) with a thickness of 12 μm such that the thickness thereof after curing was 4 μm, followed by drying at 130° C. Then, the polyamic acid solution prepared through [Synthetic Example 1] was coated thereon such that the thickness thereof after curing was 26 μm, followed by drying at the same temperature, thereby forming a first polyimide precursor layer. The first polyimide precursor layer was cured from 150° C. to 395° C. for 10 minutes to form a first polyimide layer, and then was plasma-treated using a power of 6 kW under argon atmosphere.

Again, the polyamic acid solution prepared through [Synthetic Example 1] was coated thereon such that the thickness thereof after curing was 30 μm, followed by drying and curing, under the same conditions, to finally manufacture a metal-clad laminate of which the total thickness of the polyimide layers was 60 μm. The results were shown in Table 1.

COMPARATIVE EXAMPLE 1

The polyamic acid solution prepared through [Synthetic Example 1] was coated on an electrolytic copper foil (Rz=2.0 μm) with a thickness of 12 μm such that the thickness thereof after curing was 27 μm, followed by drying at 130° C., to form a first polyimide precursor layer. Again, the polyamic acid solution prepared through [Synthetic Example 1] was again coated on the first polyimide precursor layer such that the thickness thereof after curing was 27 μm, followed by drying and curing, to finally manufacture a metal-clad laminate of which the total thickness of the polyimide layers was 54 μm. The results were shown in Table 1.

COMPARATIVE EXAMPLE 2

The polyamic acid solution prepared through [Synthetic Example 1] was coated on an electrolytic copper foil (Rz=2.0 μm) with a thickness of 12 μm such that the thickness thereof after curing was 27 μm, followed by drying at 130° C., and then the resultant structure was cured from 150° C. to 395° C. for 10 minutes to form a first polyimide layer. Again, the polyamic acid solution prepared through [Synthetic Example 1] was again coated on the first polyimide layer such that the thickness thereof after curing was 27 μm, followed by drying and curing, to finally manufacture a metal-clad laminate of which the total thickness of the polyimide layers was 54 μm. The results were shown in Table 1.

COMPARATIVE EXAMPLE 3

A polyimide film (Maker: Kaneka) with a thickness of 50 μm was plasma-treated, and the polyamic acid solution prepared through [Synthetic Example 3] was coated thereon such that the thickness thereof after curing was 4 μm, followed by drying at 130° C., and then the resultant structure was cured from 150° C. to 395° C. for 10 minutes to form a thermoplastic polyimide film having a thickness of 4 μm. An electrolytic copper foil (Rz=2.0 μm) with a thickness of 12

μm was laminated therewith under the conditions of a temperature of 365° C. and a line pressure of 150 kgf/cm², thereby manufacturing a metal-clad laminate of which the total thickness of the polyimide layers was 54 μm. The results were shown in Table 1.

Among the flexible metal-clad laminates manufactured according to the above-described examples, 5 samples for each example were selected, and then the physical properties thereof were evaluated and the results thereof were summarized in Table 1.

TABLE 1

|  | Curl after drying (cm) | Adhesion (kgf/cm) | Dimensional Change (MD/TD, %) | Polyimide Rz (μm) | External Appearance after Curing |
|---|---|---|---|---|---|
| Example 1 | 4.1 | 0.4 | 0.005/0.001 | 0.4 | Good |
| Example 2 | 4.0 | 1.2 | 0.013/0.008 | 0.4 | Good |
| Example 3 | 4.0 | 1.4 | 0.025/0.013 | 0.4 | Good |
| Example 4 | 4.8 | 1.4 | 0.007/0.003 | 0.3 | Good |
| Example 5 | 3.4 | 1.4 | 0.048/0.039 | 0.4 | Good |
| Comparative Example 1 | 2.2 | 0.4 | 0.051/0.035 | >2.0 | Blister |
| Comparative Example 2 | 4.0 | 0.3 | Cannot be measured | 0.1 | Interlayer delamination |
| Comparative Example 3 | — | 1.4 | 0.079/0.073 | — | Good |

As seen from the above table, it was confirmed that the flexible metal-clad laminate according to the present invention had an excellent adhesion, a small dimensional change, and a good external appearance after curing.

As described above, the casting method is used in forming polyimide with a predetermined thickness on a metal plate, thereby maintaining an excellent adhesion between the polymer film and the metal conductive layer and maintaining a low dimensional change themselves, and the curing process of the polyamic acid varnish is performed in two lots, thereby solving the problems of blister and film curl occurring as the polyimide layer gets thicker.

Further, the surface roughness of the first polyimide layer is increased by plasma treatment, thereby providing sufficient adhesion with the second polyimide layer formed on the first polyimide layer, with the result that a casting-type manufacturing method allowing a low production cost can be applied regardless of the thickness of the polyimide layer.

What is claimed is:

1. A method for manufacturing a flexible metal-clad laminate, comprising:
   (a) coating and drying a first polyamic acid solution on a metal layer to form a first polyimide precursor layer, the first polyimide precursor having a first thickness;
   (b) coating and drying a second polyamic acid solution directly on the first polyimide precursor layer to form a second polyimide precursor layer directly on the first polyimide precursor layer, the second polyimide precursor layer having a second thickness, wherein the first polyamic acid solution and the second polyamic acid solution are not identical to each other;
   (c) imidizing the first polyimide precursor layer and the second polyimide precursor layer simultaneously to form a first polyimide layer having a coefficient of linear thermal expansion of 25 ppm/K or less;
   (d) plasma-treating a surface of the first polyimide layer to form a surface-roughened polyimide layer having a pre-determined surface roughness; and
   (e) coating and drying a third polyamic acid solution on the surface-roughened polyimide layer to form a third polyimide precursor layer on the surface-roughened polyimide layer, followed by imidizing the third polyimide precursor layer to form a second polyimide layer on the surface-roughened polyimide layer, the second polyimide layer having a coefficient of linear thermal expansion of 25 ppm/K or less,
   wherein the surface-roughened polyimide layer and the second polyimide layer have a total thickness of 30 μm to 60 μm.

2. The method of claim 1, wherein the first thickness and the second thickness are not identical to each other.

3. The method of claim 1, wherein the pre-determined surface roughness includes a surface roughness of 0.3 to 1.5μm.

4. The method of claim 1, wherein further comprising coating and drying a fourth polyamic acid solution on the third polyimide precursor layer to form a fourth polyimide precursor layer on the third polyimide precursor layer before imidizing in (e).

5. A method of manufacturing a flexible metal-clad laminate using a casting method, comprising:
   (a) casting and drying a first polyamic acid solution on a metal layer to form a first polyimide precursor layer, the first polyimide precursor having a first thickness;
   (b) casting and drying a second polyamic acid solution directly on the first polyimide precursor layer to form a second polyimide precursor layer directly on the first polyimide precursor layer, the second polyimide precursor layer having a second thickness, wherein the first polyamic acid solution and the second polyamic acid solution are not identical to each other;
   (c) imidizing the first polyimide precursor layer and the second polyimide precursor layer simultaneously to form a first polyimide layer on the metal layer, wherein the imidizing includes heating the first polyimide precursor layer and the second polyimide precursor layer to from 150° C. to 395° C., and the first polyimide layer has a coefficient of linear thermal expansion of 25 ppm/K or less;
   (d) plasma-treating a surface of the first polyimide layer to form a surface-roughened polyimide layer having a pre-determined surface roughness;
   (e) casting and drying a third polyamic acid solution on the surface-roughened polyimide layer to form a third polyimide precursor layer on the surface-roughened polyimide layer; and
   (f) imidizing the third polyimide precursor layer to form a second polyimide layer on the surface-roughened polyimide layer, wherein the imidizing includes heating the second polyimide precursor layer to from 150° C. to 395° C., and the second polyimide layer has a coefficient of linear thermal expansion of 25 ppm/K or less,
   wherein the surface-roughened polyimide layer and the second polyimide layer have a total thickness of 30 μm to 60 μm.

6. The method of claim 5, wherein the first thickness and the second thickness are not identical to each other.

7. The method of claim 5, wherein thicknesses of the first polyimide layer and the second polyimide layer are 5 to 30 μm, respectively.

8. The method of claim 5, wherein a surface roughness of the first polyimide layer is 0.3 to 1.5 μm, after the plasma-reating of the surface of the first polyimide layer.

9. The method of claim 5, further comprising: (e-1) casting and drying a fourth polyamic acid solution on the third polyimide precursor layer to form a fourth polyimide precursor layer on the third polyimide precursor layer before (f).

* * * * *